United States Patent [19]

Dollas et al.

[11] Patent Number: 5,050,068
[45] Date of Patent: Sep. 17, 1991

[54] METHOD AND APPARATUS FOR USING EXTRACTED PROGRAM FLOW INFORMATION TO PREPARE FOR EXECUTION MULTIPLE INSTRUCTION STREAMS

[75] Inventors: Apostolos Dollas; Robert F. Krick, both of Durham, N.C.; Blair D. Milburn, Beaverton, Oreg.

[73] Assignee: Duke University, Durham, N.C.

[21] Appl. No.: 252,791

[22] Filed: Oct. 3, 1988

[51] Int. Cl.[5] .......................... G06Z 9/38; G06Z 9/30
[52] U.S. Cl. ............................. 364/200; 364/262.4; 364/263.1; 364/261.3; 364/261.7
[58] Field of Search ... 364/200 MS File, 900 MS File

[56] References Cited

U.S. PATENT DOCUMENTS

| | | | |
|---|---|---|---|
| 3,771,141 | 11/1973 | Culler | 340/172.5 |
| 3,787,673 | 1/1974 | Watson et al. | 235/156 |
| 3,940,741 | 2/1976 | Horikoshi et al. | 364/200 |
| 4,078,254 | 3/1978 | Beausoleil et al. | 364/900 |
| 4,144,566 | 3/1979 | Timsit | 364/200 |
| 4,200,927 | 4/1980 | Hughes et al. | 364/200 |
| 4,439,827 | 3/1984 | Wilkes | 364/200 |
| 4,456,958 | 6/1984 | DeSantis et al. | 364/200 |
| 4,466,061 | 8/1984 | DeSantis et al. | 364/200 |
| 4,467,414 | 8/1984 | Akagi et al. | 364/200 |
| 4,720,778 | 1/1988 | Reynard et al. | 364/200 |
| 4,742,451 | 5/1988 | Bruckert et al. | 364/200 |
| 4,825,360 | 4/1989 | Knight, Jr. | 364/200 |
| 4,833,599 | 5/1989 | Colwell et al. | 364/200 |
| 4,847,755 | 7/1989 | Morrison et al. | 364/200 |

Primary Examiner—Thomas C. Lee
Attorney, Agent, or Firm—Richard E. Jenkins

[57] ABSTRACT

A prefetching replicated instruction stream machine (PRISM) computer architecture which provides sustained instruction stream performance comparable to peak performance in computer systems with instruction pipelines operates by partitioning, prior to execution, a computer program to be executed into instruction segments based on entry point and branch target instructions defining the flow changes within the program; storing selected segments in a plurality of instruction decoding units (IDUs) such that all instructions that potentially could be needed when the next instruction is executed by a central processing unit (CPU) are stored in the IDUs, and such that no single IDU contains both a segment having a branch taken instruction and a segment containing a branch not taken instruction for the same branch instruction; simultaneously decoding in a predetermined order the instruction segments stored in each IDU; and selectively communicating instructions decoded by the IDUs to the CPU in response to the value of a program instruction counter value identifying the instruction to be executed by the CPU.

33 Claims, 7 Drawing Sheets

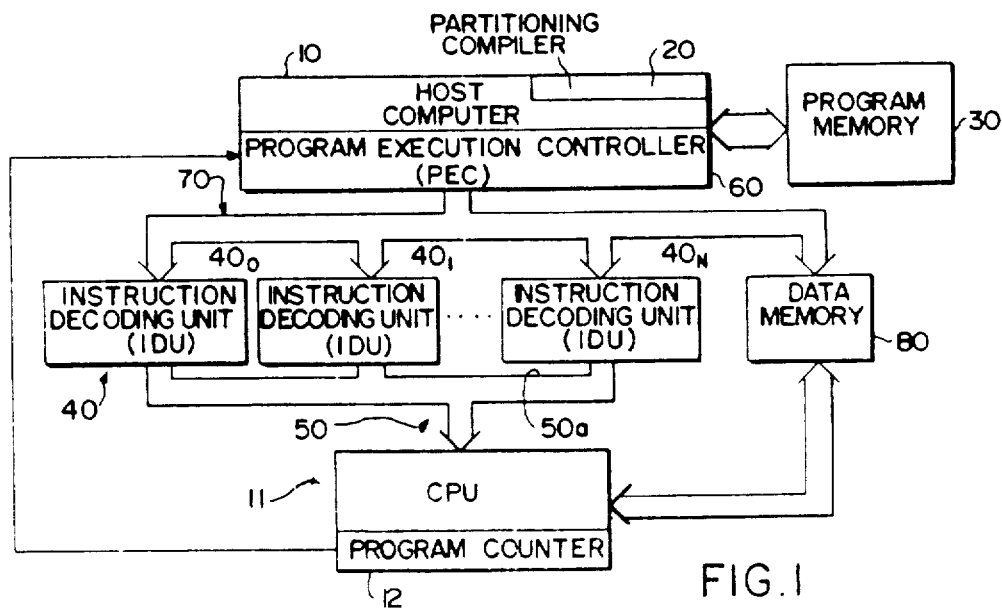

| 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|
| 1 | 0 | 0 | T | — | — | — | — | — | — | — | — | — | — | — | — | \multicolumn{3}{c}{$R_{SRC}$} | | | \multicolumn{4}{c}{$R_{DEST}$} | | | |

FIG. 7a

| 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|

1 0 1 T — — — — — — — — — — — — $R_{DEST}$ $R_{SRC}$

FIG. 7b 1 1 0 0 ... $R_{SRC}$ $R_{DEST}$

FIG. 7c 1 1 0 1 ... $R_{SRC}$ $R_{DEST}$

FIG. 7d 1 1 1 T IMMEDIATE $R_{DEST}$

FIG. 7e 0 1 0 1 ADDRESS cc

FIG. 7f 0 1 1 0 ADDRESS $R_{DEST}$

FIG. 7g 0 1 1 1 — — — — — — — — — — — — — — — — $R_{SRC}$

FIG. 7h 0 0 0 T 0 0 0 0 $R_{DEST}$ — — — — $R_{SRC}$ $R_{SRC}$

FIG. 7i 0 0 0 T 0 0 0 1 $R_{DEST}$ — — — — $R_{SRC}$ $R_{SRC}$

FIG. 7j

| 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|
| 0 | 0 | 1 | T | 0 | 0 | 0 | 0 | \multicolumn{4}{c}{$R_{DEST}$} | \multicolumn{8}{c}{IMMEDIATE} | \multicolumn{4}{c}{$R_{SRC}$} |

FIG. 7k

| 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|
| 0 | 0 | 0 | T | 0 | 0 | 1 | 0 | \multicolumn{4}{c}{$R_{DEST}$} | – | – | – | – | \multicolumn{4}{c}{$R_{SRC2}$} | \multicolumn{4}{c}{$R_{SRC1}$} |

FIG. 7l

| 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|
| 0 | 0 | 0 | T | 0 | 0 | 1 | 1 | \multicolumn{4}{c}{$R_{DEST}$} | – | – | – | – | \multicolumn{4}{c}{$R_{SRC2}$} | \multicolumn{4}{c}{$R_{SRC1}$} |

FIG. 7m

| 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|
| 0 | 0 | 1 | T | 0 | 0 | 1 | 0 | \multicolumn{4}{c}{$R_{DEST}$} | \multicolumn{8}{c}{IMMEDIATE} | \multicolumn{4}{c}{$R_{SRC}$} |

FIG. 7n

| 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|
| 0 | 0 | 0 | T | 0 | 1 | 1 | 0 | – | – | – | – | – | – | – | – | – | – | – | – | \multicolumn{4}{c}{$R_{SRC2}$} | \multicolumn{4}{c}{$R_{SRC1}$} |

FIG. 7o

| 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|
| 0 | 0 | 1 | T | 0 | 1 | 1 | 0 | – | – | – | – | \multicolumn{8}{c}{IMMEDIATE} | \multicolumn{4}{c}{$R_{SRC}$} |

FIG. 7p

| 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|
| 0 | 0 | 0 | T | 1 | 0 | 0 | 0 | \multicolumn{4}{c}{$R_{DEST}$} | – | – | – | – | \multicolumn{4}{c}{$R_{SRC}$} | \multicolumn{4}{c}{$R_{SRC}$} |

FIG. 7q

| 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|
| 0 | 0 | 0 | T | 1 | 0 | 0 | 1 | \multicolumn{4}{c}{$R_{DEST}$} | – | – | – | – | \multicolumn{4}{c}{$R_{SRC}$} | \multicolumn{4}{c}{$R_{SRC}$} |

FIG. 7r

| 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|
| 0 | 0 | 0 | T | 1 | 0 | 1 | 0 | \multicolumn{4}{c}{$R_{DEST}$} | – | – | – | – | \multicolumn{4}{c}{$R_{SRC}$} | \multicolumn{4}{c}{$R_{SRC}$} |

FIG. 7s

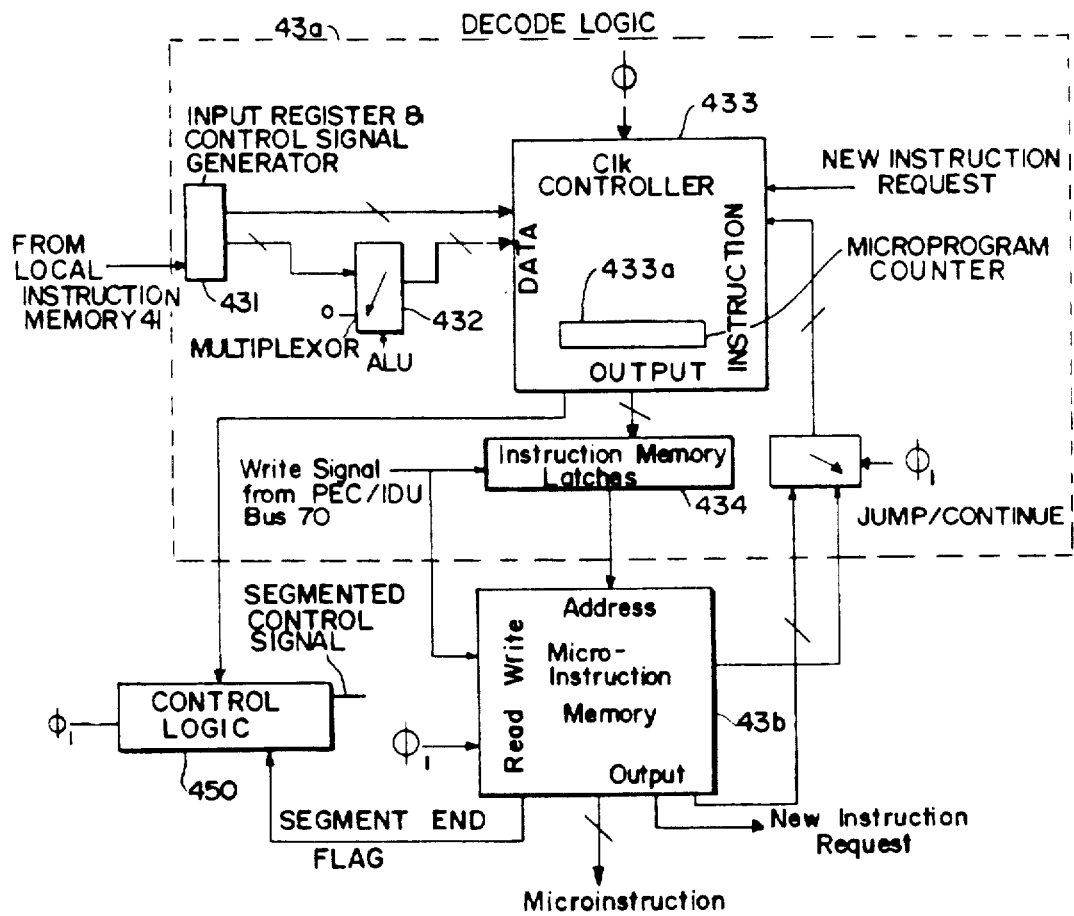

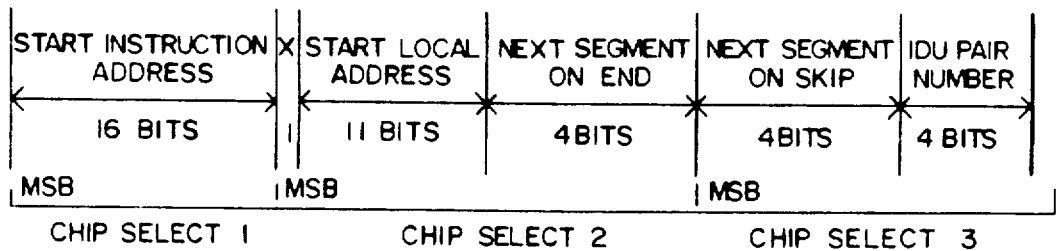
FIG. 7t
FIG. 7u
FIG. 7v
FIG. 7w
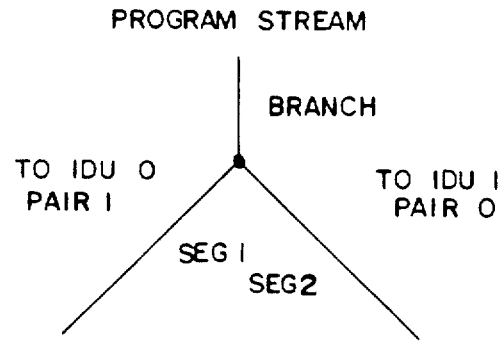
FIG. 9
FIG. 10

METHOD AND APPARATUS FOR USING EXTRACTED PROGRAM FLOW INFORMATION TO PREPARE FOR EXECUTION MULTIPLE INSTRUCTION STREAMS

BACKGROUND OF THE INVENTION

1. Technical Field of the Invention

The present invention relates generally to computer architectures for instruction decoding, and more particularly to apparatus and method for improved prefetching and decoding for computer architectures with instruction pipelines.

2. Background Art

Instruction pipelining of computer operations has long been used to increase the performance of von Neumann computers. In the simplest von Neumann architecture, each phase of the execution of an instruction (e.g., fetch, decode, execute) is done sequentially even if the hardware needed for the phases never interacts. Pipelining allows phases of more than one instruction to be processed by non-interacting sections of hardware at the same time. Typically, there are three phases of instruction execution: the instruction fetch, instruction decode and instruction execute. These three operations can be processed independently of one another as long as the phases of each instruction remain sequential. Thus, the fetch of a first instruction can be performed in one cycle. When this phase is complete, the decode unit processes the first instruction. The fetch unit, however, can now begin the processing of a second instruction in parallel with the decoding of the first instruction. This pipelining of instructions allows the completion of an instruction every cycle, once the pipeline is filled, even though each instruction takes more than one cycle to process.

However, program flow changes, such as branch statements and procedure calls and returns, which cause the program instruction code to be non-sequential, create problems for pipelined architectures. For example, with the three-stage pipelines discussed above, if a branch instruction is instruction 1, two other instructions will have been partially processed when the direction of the branch is determined in the execute stage. If these instructions are not the target of the branch, the instructions at the proper location must be fed into the pipeline and the processing already done has been wasted. This delay causes a two cycle "bubble" in the execution stream. Also, if this processing is not suspended before it changes the state of the machine, some of it could produce incorrect results which must be fixed before the correct instruction can begin. This situation would cause a larger bubble. Since branches and other program flow changes can account for 12% to 33% of the instructions executed in a program, the branch problem can cause a significant degradation in performance because each branch can potentially delay the execution of the pipeline if the incorrect target is processed before the branch is executed.

The branch problem thus contributes to the discrepancy between the peak and sustained performance of a machine. The peak performance is the maximum attainable instruction throughput. To determine this performance, the instruction code is organized to take advantage of all the features of an architecture and to avoid all of its possible bottlenecks. Sustained performance is a measure of throughput based on a normal load on a machine. If pipeline bubbles cause a performance degradation in a particular machine, the peak performance would be obtained using a workload or program with very few or no branches. Standard computer programs, of course, have branches, causing the sustained performance to be a function of the number of these branches.

Many approaches have been used to reduce the performance degradation due to these pipeline branch effects. One early developed and simple approach to this problem is to allow the instruction prefetching mechanism to continue down one direction of the branch. This approach is used in the control unit of the ILLIAC IV, for example, see the paper by Barnes, et al., "The ILLIAC IV Computer", *IEEE Transactions*, pp. 746–757, August, 1968. In this approach, if the correct direction has been prefetched, the pipeline continues operating without bubbles. If the wrong direction is prefetched, however, the pipeline must be flushed and restarted at the target instruction. The simplest implementation of this method involves prefetching the instructions immediately following the branch. If the branch is not taken, no bubble will occur. Branches, however, are taken in normal types of programs over 60% of the time.

Instead of prefetching in one direction, prefetching the instructions in both directions of the branch has also been tried. Systems using variations of this method include the IBM 360/91, which is described in the texts by Hwang et al., *Computer Architecture and Parallel Processing*, McGraw-Hill, 1984; and by Kogge, *Architecture of Pipelined Computers*, McGraw-Hill, 1981. Both directions of the branch are prefetched. The instructions in one of the directions are decoded until the branch has been executed. If the other direction was taken, the decoded instructions would be flushed, and the prefetched other direction would be decoded.

Prefetching in both directions of a branch improves performance if only one branch is in the pipeline at a time. If multiple branches are being processed, all the possible targets of those branches need to be prefetched. The performance improvement based on the number of branches which have been prefetched is proportional to the square root of the number of branches, without taking into account the distance between branches. If branches are separated in the code, they could be loaded into different fetching units one after another. The amount of prefetching called for by this approach greatly increases the complexity of the instruction fetch unit.

In order to decrease the number of prefetched instructions which are not used, branch prediction can be used. This prediction of which direction a branch may take can be either dynamic (during execution) or static (during compilation). Several dynamic methods are discussed in the paper by Lee et al, "Branch Prediction Strategies and Branch Target Buffer Design", *Computer*, Vol. 17, No. 1, January, 1984. Another dynamic approach, which is described in the paper by McFarling, et al., "Reducing the Cost of Branches", *Proceedings of the 13th International Symposium on Computer Architectures*, pp. 396–403, June, 1986, uses a cache-like table containing lines of two prediction bits. Access to this table is determined by the low-order bits of the branch address. The two bits give the recent history of the activity of the branch. This history is used to predict the most likely direction the branch will take, and the prefetch of the branch target is based on this decision. Once the true branch direction is decided, a finite state machine updates the history bits. If the prediction is correct, the branch penalty is only one cycle since the decode phase is still suspended until the branch is executed.

Static prediction involves having the compiler set a single prediction bit. This bit is not changed during program execution. One such system is the Bell Labs CRISP microprocessor, which is described in the paper by Ditzel, et al., "Branch Folding in the CRISP Microprocessor: Reducing Branch Delay to Zero", *Proceedings of the 14th International Symposium on Computer Architectures*, pp. 2-9, 1987. The CRISP system relies on a special compiler to assign the static prediction bit.

Both static and dynamic prediction involve an increase in the complexity of the system, either in software or in hardware. Neither scheme is able to predict the direction of a branch with 100% accuracy. While these schemes certainly improve performance, they do not solve the non-sequential program flow problem.

Branch target buffers or branch history tables are further extensions to branch prediction methods. They use a cache-like structure to store the target which the branch has recently addressed. Such systems are described in the text by Stone, *High-Performance Computer Architecture*. Addison-Wesley, 1987. When a branch is encountered, its address is used as a tag into the cache, which contains the last target address of that branch. From this point, the procedure progresses in the same manner as other branch prediction methods. When the target of the current branch is actually determined, the cache is updated. If this prediction is wrong, a full branch penalty is incurred.

The size of the branch target buffer obviously has an effect on its performance. It has been shown that the buffer must be fairly large. For example, the MU-5, a high speed general purpose computer built in the early 1970's at Manchester University, with an eight entry branch target buffer only had the correct target in its buffer 40-60% of the time. This hit rate can be increased to 93% with a larger buffer of 256 entries.

The best improvement obtained by a branch target buffer is for unconditional branches and subroutine calls. After the target of one of these type of instructions is stored, the prediction is always correct provided the line is not removed from the buffer due to the replacement policy of the cache. This system also works well when predicting the control loop structure branches. A loop will branch many times to one target and only once to the other. A branch target buffer will only make the wrong prediction once. The buffer can also be constructed to contain the next few instructions after the predicted branch, as described in the article by Lilja, "Reducing the Branch Penalty in Pipelined Processors", *Computer*, pp. 47-55, July, 1988. If a loop is small, this branch target buffer resembles an instruction cache. The hardware complexity, however, is greater than other solutions and this scheme is also not 100% accurate.

Another method of dealing with the branch problem involves the use of code reorganization to fill the bubbles with useful work. Delayed branching uses a compiler to fill the gap following a branch with instructions normally occurring before the branch. When the compiler detects a branch, it searches through the instructions preceding it looking for instructions on which the branch computation is not dependent. If any are found, they are relocated into delay slots following the branch. The number of delay slots corresponds to the delay involved in obtaining the target. No matter what the outcome of the branch, the delayed instructions will always need to be executed because they were originally located before the branch in the program. If all the delay slots have been filled, the target of the branch will be ready to be input into the pipeline after the delayed instructions have started. This process produces no pipeline bubbles. Delayed branching is used in various RISC systems such as the IBM 801, see the paper by Radin, "The 801 Minicomputer", *Proceedings on the Architectural Support for Programming Languages and Operating Systems*, pp. 39-47, March, 1982; the Berkeley RISC I, see the paper by Patterson et al., "RISC-I: A Reduced Instruction Set VLSI Computer", *Proceedings of the 8th International Symposium on Computer Architectures*, May, 1981; MIPS, see the paper by Hennessy et al., "MIPS: A VLSI Processor Architecture", *Proceedings of the CMU Conference on VLSI Systems and Computations*, October, 1981, and the paper by Moussouris, et al., "A CMOS RISC Processor With Integrated System Functions", *Proceedings of the Spring COMPCON*, p. 126, 1986; and the HP Spectrum, see the paper by Birnbaum, et al., "Beyond RISC: High Precision Architecture", *Proceedings of the Spring COMPCON*, p. 40, 1986.

The success of delayed branching, however, is dependent on finding instructions to fill the delay slots. The instructions cannot affect the outcome of the comparison or the branch in any way since, once they are relocated, they will be executed after the branch begins. In the MIPS, for example, one delay slot can be filled 70% of the time. A second slot can only be filled 25% of the time. These unfilled slots are filled with socalled "no operations" (NOP's) and are essentially wasted. Delayed branches also introduce some complexity into the construction of a machine's compiler since it is the mechanism which searches for and relocates the appropriate code.

Branch folding is another type of code reorganization, which is used by the CRISP microprocessor. See the Ditzel et al. paper referenced hereinabove; the paper by Berenbaum et al., "Architectural Innovations in the CRISP Microprocessor", *Proceedings of the Spring COMPCON*, pp. 91-95, February, 1987; the paper by Ditzel et al., "The Hardware Architecture of the CRISP Microprocessor", *Proceedings of the 14th Annual International Symposium on Computer Architectures*, pp. 309-19, June, 1987; and the paper by Berenbaum et al., "A Pipelined 32b Microprocessor with 13kb of Cache Memory", *Proceedings of the International Solid States Circuits Conference*, pp. 34-35, February, 1987. CRISP uses a horizontal microcode where each microinstruction contains two fields, the Next-PC and the Alternate Next-PC. These fields determine the address of the next instruction. During the instruction decoding, the hardware can identify a branch instruction and "fold" its two target addresses into the field of the previous microinstruction. In a sense, each instruction can be thought of as a branch instruction because each instruction contains the address (or addresses) of the next instruction. Static branch prediction is used to decide which direction of the branch is to be prefetched. If the prediction is correct, the execution pipeline continues uninterrupted. In this case, branch folding actually eliminates the branch. Otherwise, the instruction fetch pipeline is flushed and the correct target is fetched. In an ideal situation, therefore, CRISP can execute more than one instruction per cycle.

The implementation of branch folding requires a complex decoding unit. It also does not, in itself, improve the performance due to solving the pipeline branch problem. It does, however, decrease the code size, in some cases considerably, causing a nearly offsetting performance improvement.

In summary, many methods, both hardware and software based, have been tried in order to improve the efficiency of instruction pipelines. The simplest solutions, such as prefetching and simple prediction, unfortunately do not result in great improvements. Other methods generate performance gains but at the cost of greater hardware and software complexity. None of the prior art solutions can guarantee that it will work all of the time. For this reason, branch problems are still a large factor in the gap between the peak performance and sustained performance.

The need for more effective processing of non-sequential programs is substantial. Most real-time applications contain various program flow changing instructions such as branches and subroutine calls. Aircraft flight control systems, particularly for aircraft with artificial stability, for example, require real-time decision making based on continually changing sensory inputs. A computing system which will not suffer performance degradation when these decisions grow in number would be extremely useful.

A large class of time-consuming algorithms also depend on conditional statements. If these branches are contained in tight loops, the performance degradation is compounded. Examples of such algorithms are fractal algorithms, and circuit testing algorithms like the D-algorithm and the PODEM algorithm. Symbolic processing also has many applications with an intrinsically serial nature, especially in the processing of linked lists, where dependence and connectivity are very localized. An architecture which could remove the performance degradation due to non-sequential program flow could greatly speed up this type of processing.

SUMMARY OF THE INVENTION

It is an object of the present invention to provide method and apparatus for obtaining a sustained instruction throughput performance from pipelined computer system which is equal to the peak performance capability of the computer system despite non-sequential program flow. This object is accomplished in accordance with the present invention by replication of the instruction fetch/decode units and the extraction of program flow characteristics from the program in a new architecture hereinafter referred to as the Prefetching Replicated Instruction Stream Machine (PRISM). More specifically, in accordance with the present invention, program flow information is extracted from the computer program to be executed prior to execution; execution of the computer program is monitored; different portions of the computer program are selectively stored in a plurality of fetch units such that all instructions that potentially could be needed when the next instruction is executed by the CPU are stored in the fetch units, and such that no single fetch unit contains both a program portion having a branch taken instruction and a program portion containing a branch not taken instruction for the same branch instruction; and instructions are selectively communicated to the CPU by the fetch units based on determination of the instruction to be executed by the CPU.

The above and other features, advantages and objects of the present invention are described in or apparent from the following detailed description of preferred embodiments.

BRIEF DESCRIPTION OF THE DRAWINGS

The preferred embodiment will be described with reference to the drawing, in which:

FIG. 1 is a block diagram of one embodiment of the PRISM architecture of the present invention;

FIGS. 2a-2c show three examples of computer program partitioning schemes;

FIGS. 6a-6d show the basic formats, and FIGS. 7a-7w show the formats of the individual instructions of an exemplary CPU instruction set for use with the present invention;

FIG. 8 is a more detailed block diagram of the decoder portion of an IDU;

FIG. 9 is a diagram of the format of select signals for a SCT memory; and;

FIG. 10 is a program flow diagram showing the determination of segment pairs.

DETAILED DESCRIPTION OF THE PREFERRED EMBODIMENTS

I. Overview

A. General Organization

Figure 3:
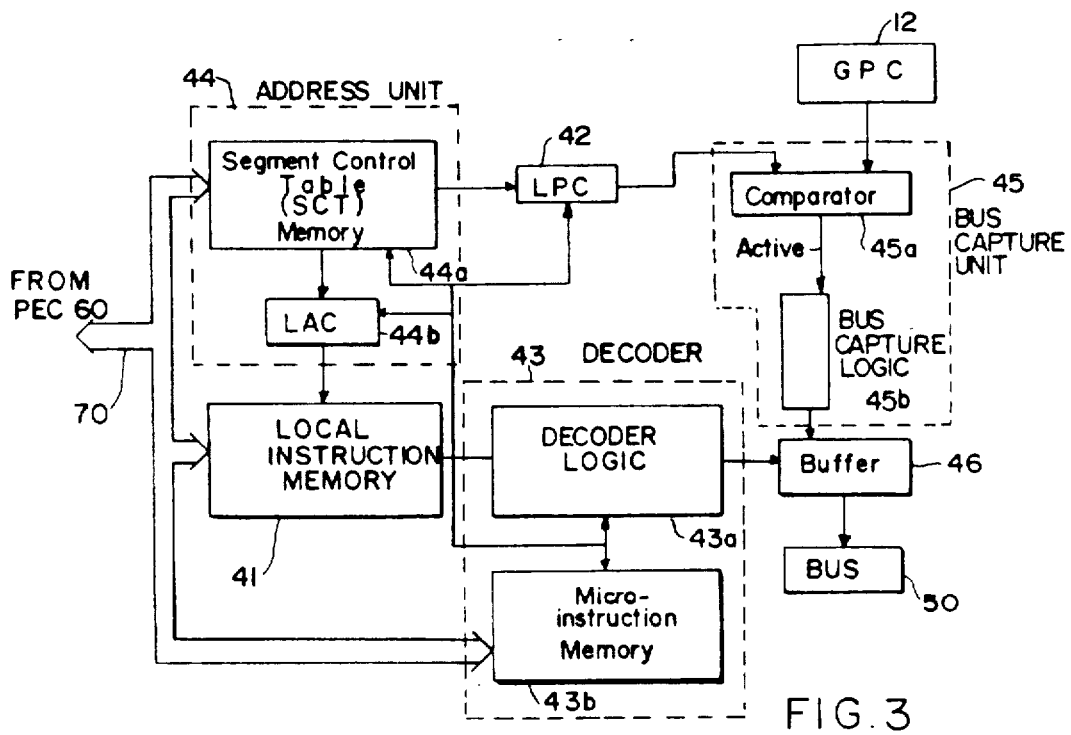
FIG. 3 is a block diagram of a PRISM IDU.

FIG. 1 shows the PRISM architecture implemented in conjunction with a host von-Neumann computer 10. The PRISM architecture utilizes a conventional program instruction executing CPU 11 with a program counter or instruction pointer 12, which will hereinafter be referred to as global program counter (GPC) 12 for the sake of clarity. It will be appreciated that the PRISM architecture can of course also be implemented in a self-contained computer system, without the need for a host computer. The PRISM architecture generally comprises a partitioning compiler 20 for extracting program flow information from the computer program to be executed prior to execution thereof; a program memory 30 for storing the compiled program and the program flow information; at least one, and preferably a plurality of N identical fetch units (a preferred embodiment of which is hereinafter referred to as instruction decoding units) 40 for storing different portions of the compiled computer program and selectively communicating instructions to CPU 11 via an IDU/CPU microinstruction bus 50, as described in more detail hereinafter; and a program execution controller (PEC) 60 for controlling distribution of program portions and program flow information to instruction decoding units (IDUs) 40 via a PEC/IDU instruction bus 70 in the manner to be described in more detail hereinafter. As shown, a data memory 80 separate from program memory 30 advantageously also is provided for storing the operands or other data to be processed during execution of the program instructions.

B. The Partitioning Compiler

There are several alternative approaches to implementation of partitioning compiler 20. In a preferred embodiment, a compiler program which generates, at the time of program compilation, a program flow graph of the compiled code corresponding to the program to be executed by CPU 11 constitutes compiler 20. The PRISM architecture requires a prior knowledge of the locations of the entry points and branch targets of the computer program to be executed, but not knowledge of when, where or if these points will be accessed. As will be described in more detail hereinbelow, this knowledge is extracted or filtered from the object or executable code of the program by partitioning compiler 20, which breaks the code into segments based on the program's entry points and branch targets. Entry points are lines of code which can be used to begin or enter the program, such as the starting line, the beginning of a procedure, or the return point from a procedure. As used herein, a branch target is any instruction which could follow a branch, i.e., branch taken and branch not taken instructions. These points are usually identified by labels. Partitioning compiler 20 advantageously also determines the size and dependencies of each segment. These segments can be formed in various ways with the only condition being that every entry point must be identified. FIGS. 2a and 2b show two examples of partitioning schemes. In the first segmentation scheme of FIG. 2a, the code is broken into segments after each branch and before each label. In the segmentation scheme of FIG. 2b, the code is broken only before each label.

The partitioning aspect of the work done by partitioning compiler 20 is less than that done by conventional compilers which deal with branches using various code relocation techniques. Partitioning compiler 20 merely parses the code into segments to prepare it for PEC 60, it does not have to keep track of any code reorganization or relocation. The program flow graph produced by partitioning compiler 20 is stored in program memory 30, preferably in the form of a table or a linked list. The segment size information is useful in determining the priority of the loading of different segments into the IDUs 40 by PEC 60.

Alternatively, partitioning can be accomplished manually, and the program flow graph data loaded by the operator into program memory 30.

C. The Program Execution Controller

PEC 60 has two principal tasks: monitoring execution of the computer program and loading selected code segments into selected IDUs 40 at the appropriate time based on the program instruction being executed by CPU 11 and the program flow graph information stored in program memory 30. PEC 60 must load segments into IDUs 40 such that all instructions that potentially could be needed when the next instruction is executed by CPU 11 are stored in IDUs 40, and such that no single IDU 40 contains both a segment having a branch taken instruction and a segment having a branch not taken instruction for the same branch instruction. This requirement is necessary to ensure that the target will be decoded and ready when the branch is executed.

In general, PEC 60 traces the flow of a program obtained from partitioning compiler 20 and stored in program memory 30. It uses the segment flow, dependency, and size information to guarantee that two dependent segments are not loaded in the same IDU. PEC 60 monitors the execution of the program by CPU 11 to determine when segments need to be loaded for decoding. It then loads the segments in IDUs 40 so that all instructions that potentially could be needed when the next instruction is executed will be available to CPU 11.

One constraint preferably should be met to ensure sustained operation. The bus bandwidth of PEC 60 should be high enough so that if long, serial segments of instructions are being executed, they are able to be loaded into IDUs 40 faster than CPU 11 is able to execute them.

D. Instruction Decoding Unit

In its most basic form, each IDU 40 is primarily a fetch unit which is loaded by PEC 60 with only one segment at a time, and simply determines when its resident segment is needed for execution by CPU 11. Advantageously, each IDU 40 stores multiple segments. In addition, for those computer architectures which require decoding of compiled instructions prior to execution by CPU 11, IDUs 40, in addition to storing fetched segments provided by PEC 60, also decode the instructions in the stored segments which potentially will be needed for program execution. Referring to FIG. 3, one preferred embodiment of such an IDU 40 comprises a local instruction memory 41 for storing the instruction segments loaded from PEC 60; a local program counter (LPC) 42 for indicating which instruction has been fetched from local instruction memory 41 and decoded and is available for execution; an instruction decoding pipeline, or decoder, generally denoted 43, to decode instructions resident in the IDU local instruction memory 41 into the form required by CPU 11; an address unit, generally denoted 44, for determining which resident instruction segments are to be decoded; and a bus capture unit, generally denoted 45, for determining when the IDU 40 should take or relinquish control of IDU/CPU instruction bus 50.

Local instruction memory 41 stores instruction segments which have been loaded from PEC 60 via PEC-/IDU bus 70. Since PEC 60 has knowledge of segment sizes and knows which segments have already been loaded into IDUs 40, the memory size does not greatly affect the performance of instruction memory 41. Memories 41, however, preferably should be large enough to contain more than one reasonably sized code segment to avoid continuous loading and unloading of segments between the IDUs 40 and PEC 60.

LPC 42 indicates the program, not the local, address of the instruction which has been decoded. This information is loaded with the segments from PEC 60. During the processing of a serial code segment, LPC 42 is incremented in synchronization with GPC 12 of CPU 11. When a segment is either completed or not needed, a new value is loaded into LPC 42 from address unit 44. LPC 42 is also used by bus capture unit 45, as described in more detail hereinbelow.

In general, decoder 43 does all of the instruction decoding necessary for CPU 11, and can be built to decode instructions into any form needed by CPU 11, including complete memory operand decoding, if desired. Having decoder 43 access data memory 80, however, creates serious data memory contention and coherency problems resulting from the multiple IDUs 40 and CPU 11 attempting to access data simultaneously. For this reason, memory operand decoding preferably is left to CPU 11. Decoder 43 advantageously comprises decode logic 43a and a microinstruction memory 43b for storing microprograms corresponding to each program instruction. The decoded microinstructions advantageously are stored in a buffer 46 controlled by bus capture unit 45.

Address unit 44 determines which segment to decode next after the completion of the current segment being decoded, and recognizes whether a segment has been skipped so as to initiate decoding of another segment. Address unit 44 advantageously comprises memory 44a in which is stored a segment control table (SCT) containing dependency information supplied by PEC 50 regarding the segments loaded into the associated IDU local instruction memory 41. If the current segment is either branched from or terminated, the IDU 40 supplying instructions to CPU 11 relinquishes control of IDU/CPU instruction bus 50. The SCT is consulted to determine the next segment to be decoded. Since each segment is loaded in one and only one IDU 40, there will never be contention for IDU/CPU instruction bus 50, and only one IDU 40 will contain the instruction at any specific program location.

The SCT also includes the base program addresses of each segment resident in the associated IDU 40, which address are used by LPC 42. The base addresses are the global address of the start of a segment in the program address space and the local address of the start of the segment in the local memory 41 of the associated IDU. The base local addresses are stored in order to access the local IDU memory 41.

Since PEC 60 loads a particular segment in only one IDU 40 and the program addresses are unique, bus capture unit 45 advantageously is totally distributed, as shown. It will be appreciated that a single bus capture unit could be provided to interface all of the IDUs 40 with CPU 11. Bus capture unit 45 advantageously simply comprises a comparator 45a for comparing the associated IDU LPC 42 value with the GPC 12 value, and bus capture logic 45b responsive to comparator 45a for capturing IDU/CPU bus 50 when the LPC value and GPC value are equal.

The number of IDUs 40 required to ensure that there are no bubbles in the instruction pipeline and that the sustained performance is equal to the peak performance is bounded by the maximum fetch and decode time of an instruction, provided that no hardware case statements are allowed, and the GPC 12 value may not be computed during program execution (i.e., there is no program counter relative branching). A hardware case statement means that a single branch statement could have a potentially unbounded number of targets. If the number of potential targets of the case is bounded, then an upper bound will exist, although the required number of IDUs 40 will grow exponentially with the number of targets. If the value of GPC 12 can be calculated during program execution, partitioning compiler 20 cannot know all of the potential entry points and cannot properly partition the program.

E. The Central Processing Unit

CPU 11 can have any desired organization as long as it is a von Neumann computer having a GPC 12. GPC 12 is needed so that the address of the program instruction to be executed may be broadcast to all of the IDUs 40 to obtain the proper decoded instruction. As mentioned hereinabove, access to data memory 80 advantageously is controlled by CPU 11 in order to eliminate memory contention and coherency problems. This feature also allows data memory 80 to employ any caching or other techniques to speed data memory accesses.

The structure and operation of the main PRISM components, and their interaction with CPU 11, will now be described in more detail.

II. Program Partitioning

For the sake of clarity, partitioning compiler 20 will be described with reference to a host computer 10 having a regular compiler that generates executable, rather than object, code, and hence no provision needs to be made for relocation. Further, it will be assumed that all conditional statements in the program to be executed are binary, i.e., there are only two branches which can potentially be taken upon execution of a conditional statement. However, it will be appreciated by those skilled in the art that partitioning compiler 20 is readily adapted to relocatable (object) code partitioning, since the only difference between the two versions is the requirement for the addition of an offset to partition addresses in the case of an object code compiler. Similarly, it will be appreciated that partitioning compiler 20 is readily adapted to work with nonbinary conditional statements.

In accordance with a preferred method of program partitioning which has been successfully employed by the inventors, a segment may contain only one entry point instruction (statement), which must be the first instruction of that segment. An example of this segmentation scheme is shown in FIG. 2c, which is similar to the segmentation scheme shown in FIG. 2a. Sequential code be broken arbitrarily into segments if necessary, e.g., if a single segment is too long to fit in the local instruction memory 41 of a single IDU 40. This narrowing of the architecture makes it easier to break a program into segments. It also allows an IDU 40 to more easily recognize when a segment has been skipped. In order for the end of a segment to be recognized, a segment end flag advantageously is added to the code for each instruction. The flag is set to zero for the last instruction in a segment.

Partitioning compiler 20 advantageously is configured to generate the program flow graph as a table, which contains the following information for each segment: segment name (not necessary but useful); start address of segment; end address of segment; and, assuming the conditional statements to be executed are binary, a first potential next segment (either name or address) and a second potential next segment (either name or address). Since the conditional statements to be executed are binary, it will be appreciated that there can be at most two segments following each segment (for branch taken or for branch not taken). In case of subroutine calls and unconditional branches, there is only one potential next segment.

The naming of the segments can be sequential, or other information can be used (e.g., the segment starting address uniquely defines a segment and therefore it can be used instead of another name).

The flow graph information on segments can be generated in one or two passes by compiler 20. It will be appreciated that information can be extracted directly from object or from executable code; indeed, any conventional disassembler can find all labels in a program, and therefore can find all entry points (segment start addresses). It is advantageous, however, to have the compiler itself generate the program flow graph since a table of all labels will exist in the compiler's code generator, and therefore there needs to be no duplication of work.

The segments advantageously are defined as follows:
i) Labels always constitute segment beginnings.

ii) Ends of segments include branches (conditional or unconditional), subroutine calls and any other instructions which will force or potentially change GPC 12 from being incremented by a value other than one (one being the increment value between any two successive instructions within a segment).

iii) Segment ends are also deemed to include all addresses immediately preceding segment starts, even though there can be implementations which do not require this condition. With this partitioning convention, if some portion of sequential code can be bypassed sometimes by jumping to a label in the middle of a sequential code, such code will be broken into two distinct segments, with the first segment having only one potential next segment, namely the second segment. The information regarding what instructions cause transfer of the program flow of control is readily determined from the CPU instruction set.

iv) The first instruction of a program is necessarily a segment start and the last instruction is a segment end. Consequently, by construction, every segment beginning will be preceded by a segment end. Thus the entire code will be broken into well-defined segments. Also by construction, there will never be a case in which two instructions within a segment are not in sequential memory addresses, since the only way to have such a case is from a branch, which automatically defines a segment end.

v) In the case of unconditional branches and subroutine calls, there is no second potential next segment and this entry is thus left blank in the program flow graph table. In these cases, the first potential next segment is the segment to which the control of a program is transferred, uniquely defined by the branch or the call. In the case of conditional branches, there are two potential next segments, one for the branch taken and one for the branch not taken. In this case, too, the potential next segments are well defined, and the branch segment addresses are used to complete the table.

vi) In the case of a RETURN statement, though, since a subroutine may have been entered from any number of points in the program, the potential next segment entries advantageously are left blank for a statically compiled program flow graph. As described in more detail hereinbelow, during execution, PEC 60 maintains a LIFO stack of return addresses, and the top of that stack is considered an "active segment" if there is no first potential next segment information in the program flow graph for the segment which CPU 11 is currently executing. These return addresses are defined as the GPC value of the subroutine call incremented by 1, and this return GPC calculation is made at the time of the subroutine call. Therefore, real-time operation is maintained at the system level.

If relocatable code is to be partitioned, a loader for converting absolute addresses from the nominal start address (to which the host compiler always generates code) to the actual starting address is needed. This loader is no different from a conventional loader for converting relative to absolute addresses, except that the appropriate offset needs to be added also to the program flow graph for consistency.

True GPC-relative addressing modes cannot be used for instructions because the next instruction, and therefore the next segment, would not be well defined. Sometimes, GPC-relative addressing modes are used in order to make code relocation easy (e.g., there can be instructions like "if condition so-and-so exists, jump 5 addresses down"). These types of instructions can be used with the PRISM architecture because the entry point of the following segment can uniquely be determined by the instruction itself (it does not depend on run-time information like the contents of a register). Nonetheless, all of the segment relocation information applies here, too, as in the previous cases.

Where the existing architecture of host computer 10 includes compilers, partitioning compiler 20 advantageously comprises a filter program rather than a full-fledged compiler. The output of partitioning compiler 20 is a set of two files, one containing the executable code and one containing the program flow graph, in the form of the table described above. The two files are stored in program memory 30.

III. The Program Execution Controller

Figure 4:
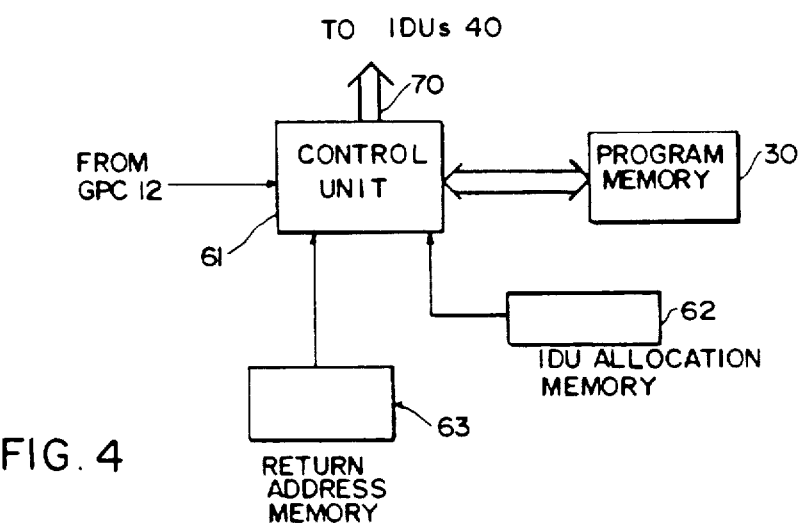
FIG. 4 is a block diagram of a PRISM PEC.

In its most basic implementation, as shown in FIG. 4, PEC 60 comprises a segment distribution control unit 61, an IDU allocation memory 62, and a return address memory 63. Control unit 61 monitors GPC 12 to determine the program instruction, and hence the segment, which is presently executed by CPU 11. Using the program flow graph information stored in program memory 30, control unit 61 determines which of the program segments is (are) the one or two potential next segments to be executed following execution of the present segment. Control unit 61 then loads each potential next segment into the local instruction memory 41 of a different IDU 40 by copying the segment(s) from program memory 30 to the respective local instruction memory-(ies) 41. At the same time, control unit 61 updates the SCT(s) stored in the associated IDU address unit(s) 44 so that the respective IDU(s) 40 know that the segments has (have) been loaded and should be decoded.

In order to ensure that segments are properly distributed among the IDUs, control unit 61 stores in IDU allocation memory 62 information identifying which IDU 40 is active, i.e., has captured IDU/CPU bus 50 for transferring the decoded instructions of the segment presently being executed by CPU 11. Based on this information, control unit 61 chooses a non-active IDU for loading of the first potential next segment, which may cause the previous contents of the local instruction memory 41 of that IDU to be overwritten. Control unit 61 then updates memory 62 to reflect in which IDU the newly loaded potential next segment resides; and repeats the same procedure described above with respect to the second potential next segment, if there is one, with the additional constraint that the IDU selected for loading of the second potential next segment cannot be the same IDU in which the first potential next segment resides, so that the two potential next segments can be decoded in parallel.

Control unit 61 also generates a series of return addresses in the manner described hereinabove, which are stored in a LIFO stack in return address memory 63. When the program flow graph does not contain a first potential next segment entry, control unit 61 uses the return address at the top of the LIFO stack to determine the segment which is to be loaded as the single potential next segment.

It will be appreciated that once execution of a segment by CPU 11 has been completed, the IDU containing that segment is considered "clear", and can be used to load a new segment. Similarly, when a segment change occurs in the program execution (which control unit 61 knows has occurred by reason of the change in the value of GPC 12), the IDU which contains the bypassed potential next segment can be immediately overwritten, typically with the next potential next segment.

It will be further appreciated that the embodiment of PEC 60 described hereinabove has the advantages of being simple and well-defined, not requiring much intelligence, and being readily capable of implementation with current technology. In a further, more complex, preferred embodiment of PEC 60, which provides equivalent system performance with slower memory components, and/or slower buses, and/or fewer IDUs, control unit 61 comprises at least one processor for more closely evaluating the program flow graph, as described in more detail hereinbelow, and IDU allocation memory 62 stores a table identifying what segments are presently loaded in each IDU 40.

In many instances, a segment which has been bypassed in execution may be soon needed. For example, in the case of an outer loop with two inner segments of code based upon a conditional statement, the segment which was not used may be needed in the next iteration of the outer loop. The at least one processor evaluates the program flow graph to identify such segments, and selects the IDUs for potential next instruction loading so as to minimize the need to reload segments which may soon be needed again if bypassed. It will be appreciated that this form of operation has one advantage and one drawback. The advantage is that segments are not constantly deleted and rewritten, and hence there is less bus activity required to load segments. The drawback is that in order to achieve this goal, PEC 60 has to be more complex.

Control unit 61 advantageously also performs the functions of "garbage collection" within and "good" segment allocation among IDUs 40. Garbage collection is accomplished as follows. Control unit 61 determines how large every segment is by subtracting the segment end address from the segment start address, and then determines the minimum time which CPU 11 will spend on the segment, e.g., based on the segment size. If the potential next segment(s) for a segment presently being executed by CPU 11 already reside(s) in the IDUs, control unit 61 uses the CPU segment execution time to remove the information on unneeded segments resident in the IDUs from the SCTs of the associated IDU address units 44. As a result, consistency problems are avoided, and the IDU local instruction memories 41 never have to be cleared.

With the removal of a segment entry from a SCT, the associated local instruction memory 41 is automatically released for future use. This may lead, though, to fragmentation of the IDU local instruction memories 41 if the available contiguous memory space for a new segment is too small. This potential problem can advantageously be avoided by copying each segment which is to be retained to appropriate contiguous space in the local instruction memory 41; and then updating the SCT entry for the base local address (in local instruction memory 41) of each moved segment to point to its new starting address.

The "good" allocation of segments into the IDUs is desirable because it leads to less fragmentation, and hence a smaller need for continuous garbage collection. However, optimal allocation of segments is neither desired (it does not enhance the speed of operation), nor contemplated (because the problem is NP-complete). The general allocation problem is one of bin-packing with package removals. In bin-packing, a number of packages (segments of code) are placed in a number of bins (the IDUs). In the case of the PRISM bin-packing problem, the number of bins are fixed, and segments of code which are not needed can be considered as packages which are removed. Conventional bin-packing algorithms such as the first fit (less advantageous) or best-fit (quite advantageous) algorithms can be used to place the segments of code in appropriate free spaces of the IDUs. PEC 60 computes the size of the free spaces from the end and start addresses of the segments which are still needed to reside within the IDUs.

It will be appreciated that both garbage collection and good segment allocation are desirable for economic reasons: but if desired, each IDU can be configured to store a single segment, in which case both garbage collection and segment allocation are non-issues. The cost tradeoff is that the instruction fetch and decode pipeline is a substantial portion (hence cost) of each IDU. Thus, the use of the same IDU to store multiple segments, so as to be capable of decoding a new segment as soon as one has been completed or is known to not be needed because it was bypassed, is desirable. Moreover, with the additional garbage collection and good segment allocation features described above, fewer IDUs are needed for system operation, and slower main memory can also be used, the exact number depending on the specific implementation of the architecture.

Finally, PEC 60 advantageously makes use of additional information to speed up processing. Such information preferably includes extra flag bits in the width of the program segment memory which denote segment end; as well as additional information in the IDU SCTs. such as the "pair" of the present segment. In the case of pair information, PEC 60 loads in the SCT associated with each segment of the pair the number of the IDU which may be used instead of the one in which the segment is loaded. When an IDU captures bus 50 to feed CPU 11 decoded instructions, it broadcasts the "pair" number, so that the IDU with that number can proceed immediately with decoding of another segment (since the one it had decoded was bypassed).

IV. The Central Processing Unit

Since most available microprocessors decode their instructions on the chip, CPU 11 advantageously embodies several RISC features such as a small, regular instruction set, and a load/store architecture, where memory accesses are only through load and store operations, and all other instructions are register to register, such as the RISC structure described in the text by Stallings, *Computer Organization and Architecture*, Macmillan Pub. Co., 1986.

Despite the RISC features, CPU 11 advantageously is microcoded. The IDU's 40 decode the instructions into microcode which is fed to CPU 11 from IDU decode microinstruction memories 43b via the IDU/CPU instruction bus 50. The operand decoding advantageously is handled by CPU 11 in order to keep the data memory 80 hidden from the IDUs 40, as discussed hereinabove. With a RISC embodiment of CPU 11, this operand decoding is usually just the decoding of register locations since CPU 11 is a pure load/store machine.

Even though better instruction pipeline performance, as compared to any other conventional method, can be obtained using any instruction set with the PRISM architecture, the instruction set selected affects two aspects of the operation of a PRISM computer system, namely, the "guarantee" of whether the instruction pipelines can be kept full at all times (after the initial time to fill them); and the number of IDUs 40 required for the sustained instruction stream performance. It should be noted, though, that there is no intrinsic limitation in the PRISM architecture as to its capability for operation with less than the nominal number of IDUs 40. Indeed, even with a single unit, a PRISM computer can operate correctly; but for segments not already decoded, the main memory access time for fetching instructions and the instruction decoding time will have to be spent as needed.

If the GPC value can be computed within the program, e.g., with register-indirect addressing modes or hardware case statements, the value of GPC 12 for these instructions cannot be known a priori. Therefore, for these classes of instructions the corresponding entry points of the program cannot be predetermined, and consequently the instructions cannot be prefetched and decoded when they will be needed. Therefore, the limitation in prefetching such instructions is not a characteristic of the PRISM architecture, but rather all architectures. Register-indirect computation of the GPC 12 value and hardware case statements accordingly preferably should be avoided in the design of an instruction set for the PRISM architecture.

It should be noted that some times instructions which modify GPC 12 by a constant are used in instruction sets, in order to facilitate code relocation or compiler design. Such instructions can be accommodated in a PRISM instruction set, because the constant offsets uniquely define the entry points of the program for these instructions, and thus the sustained performance can be maintained. Appropriate loaders should be used in this case for code relocation, as described hereinabove. A distinction should also be made between indirect addressing modes for data access as compared to indirect computation of the GPC value. The sustained performance applies to the instruction pipelines, and therefore any desired indirect addressing mode can be used for data access.

The second aspect of the instruction set design affecting PRISM system operation relates to the cost of the implementation of the architecture. The required number of IDUs 40 exponentially depends on the ceiling function of the sum of the maximum fetch time plus the maximum decode time of instruction over the minimum execute time of instruction $\alpha$, for any two instructions $\alpha$ and $\beta$ such that instruction $\alpha$ follows instruction $\beta$. The base of the exponential is the number of possible branches of conditional statements, since for any two instructions that can follow each other, the fetch and decode cycles of the second instruction will have to be completed prior to the execution cycle of the first instruction, and the depth to which this coverage is needed depends on the number of the possible next instructions. For example, in the case of an instruction set having conditional statements with four possible outcomes, for a succession of this type of instruction four "first potential next" instructions, sixteen "second potential next" instructions, and so on, would have to be fetched and decoded, looking down as many levels as needed, with the levels themselves depending on the relationship of the fetch and decode times compared to the execute time. As a result of this interrelationship of the number of required IDUs 40 to the instruction set, a preferred PRISM instruction set advantageously has the following characteristics:

all of the conditional instructions are binary, so that in the worst case there are only two possible "next instructions"; and the instruction set has a balanced instruction-fetch-and-decode to instruction-execute time. In particular, instructions with long execution times (e.g., floating point operations) are entirely acceptable, whereas instructions with little or no execution times (e.g., no-operations) are to be avoided. The exact instruction set adopted would follow the requirements of the operation of the particular computer architecture used to implement the PRISM system.

Instruction decoding and pipelining are also simplified by instructions with a common length and a minimum number of formats. An example of an advantageous instruction set which has been developed is shown in FIGS. 6a-6d and 7a-7w. As shown, the instruction set is composed of 23 distinct instructions, and each instruction is 24 bits long. The instruction address space is defined with 16 bits, providing a 64K × 24 bit memory.

Referring in particular to FIGS. 6a-6d, the instruction set has four distinct formats, MOVE/LOAD/STORE (FIG. 6a); PROGRAM FLOW CONTROL (FIG. 6b); ALU OPERATIONS I (without an immediate operand) (FIG. 6c) and ALU OPERATIONS II (with an immediate operand) (FIG. 6d). Only the ALU operations set the four condition code bits accordingly. No instructions are provided for explicit support of manipulating (load, store or modify) the condition code bits, coprocessor or multiprocessor instructions, interrupt or trap handling, or sign extension from byte to word.

Referring to FIGS. 7a-7w, which show the formats of each of the instructions, the following table explains for each instruction the operation performed, the syntax, the format variables, and particular features:

LOAD (FIG. 7a)

Operation:

Load a data memory value at the address specified by the contents of ($R_{SRC}$) into the destination register ($R_{DEST}$).

Syntax:

LOAD $R_{DEST}$, ($R_{SRC}$)

Format Variables:

| T: | byte(0) |
| --- | --- |
| | word(1) |
| $R_{SRC}$: | register containing a data memory address |
| $R_{DEST}$: | register receiving the data memory contents |

Features:

1. When loading a word, the least significant address bit is set to 0.
2. When loading a byte, the upper byte of the register is unaffected.
3. To avoid operand conflicts, the load instruction requires two cycles to complete.

STORE (FIG. 7b)

Operation:

Store the contents of a source register ($R_{SRC}$) in the data memory at the address specified by the contents of the designation register ($R_{DEST}$)

Syntax:
STORE R$_{SRC}$, (R$_{DEST}$)
Format Variables:

| T: | byte(0) |
| --- | --- |
|  | word(1) |
| R$_{SRC}$ | register containing data to be stored |
| R$_{DEST}$ | register containing a data memory address |

Features:
1. When storing a word, the least significant address bit is set to 0.

MOVE (FIG. 7c)

Operation:
Move the contents of a source register (R$_{SRC}$) into a destination register (R$_{DEST}$)
Syntax:
MOVE R$_{DEST}$, R$_{SRC}$
Format Variables:
R$_{SRC}$: register containing a data memory address
R$_{DEST}$: register receiving the data memory contents
Features:
Only word moves are supported.

SWB (FIG. 7d)

Description:
Exchange the bytes of the source register (R$_{SRC}$) and store in the destination register (R$_{DEST}$).
Syntax:
SWB R$_{DEST}$, R$_{SRC}$
Format Variables:
R$_{SRC}$: register containing bytes to exchange
R$_{DEST}$: register receiving the exchanged bytes

MOVEI (FIG. 7e)

Description:
Move an immediate value into a destination register (R$_{DEST}$).
Syntax:
MOVEI R$_{DEST}$, #IMMEDIATE
Format Variables:

| T: | byte(0) |
| --- | --- |
|  | word(1) |
| IMMEDIATE: | immediate value to be stored |
| R$_{DEST}$ | register receiving the data memory contents |

Features:
For a byte operation, the lower 8 bits of immediate data are stored in the low byte of the destination register without affecting the upper 8 bits.

Jcc (FIG. 7f)

Description:
Load GPC 12 with immediate address depending upon condition codes.
Syntax:
Jcc $ADDRESS
Format Variables:

| ADDRESS: | 16 bit immediate address for the next instruction |
| --- | --- |
| cc: | condition codes to determine if PC value will change |
|  | EQ/Z (0000) |
|  | NE/NZ (0001) |

| -continued | |
| --- | --- |
| LT | (0010) |
| GE/NL | (0011) |
| GT | (0100) |
| LE/NG | (0101) |
| VC | (0110) |
| VS | (0111) |
| PL | (1000) |
| MI | (1001) |
| LO | (1010) |
| HI | (1011) |
| T/MP | (1111) |

Features:
1. No register or register indirect jumps are supported.
2. An assembler may allow tags in lieu of immediate addresses.

JSR (FIG. 7g)

Operation:
Store current GPC 12 value at the address specified by the contents of R$_{DEST}$ and load GPC 12 with immediate address.
Syntax: p1 JSR R$_{DEST}$, $ADDRESS
Format Variables:
ADDRESS: 16 bit immediate address for the next instruction
R$_{DEST}$: register containing top of the stack address
Features:
1. The contents of R$_{DEST}$ could be manipulated to support a stack structure.
2. An assembler will allow tags in lieu of immediate addresses.

RET (FIG. 7h)

Operation:
Load the GPC 12 from the address specified by the contents of (R$_{SRC}$)
Syntax:
RET R$_{SRC}$
Format: Variables
R$_{SRC}$: register containing the address of PC
Features:
1. The contents of R$_{SRC}$ could be updated to support a stack structure.
2. Because of the data memory access, two cycles are required to execute this instruction.
3. The GPC 12 value in memory should not be altered to guarantee proper operation.

ADD (FIG. 7i)

Operation:
Add contents of two source registers (R$_{SRC}$) and store result in the destination register (R$_{DEST}$)
Syntax:
ADD R$_{DEXT}$, R$_{SRC}$, R$_{SRC}$
Format Variables:

| T: | byte(0) |
| --- | --- |
|  | word(1) |
| R$_{DEST}$ | register receiving the data memory contents |
| R$_{SRC}$ | source registers containing operands |

ADDC (FIG. 7j)

Operation:

Add contents of two source registers ($R_{SRC}$) with the value of the C condition bit, and store result destination register ($R_{DEST}$)
Syntax:
ADDC $R_{DEST}$, $R_{SRC}$
Format Variables:

| T: | byte(0) |
| --- | --- |
|  | word(1) |
| $R_{DEST}$ | designation register to store result |
| $R_{SRC}$ | source registers containing operands |

ADDI (FIG. 7k)

Operation:
Add contents of a source register ($R_{SRC}$) with a zero-extended immediate value and store the result in a destination register ($R_{DEST}$).
Syntax:
ADDI $R_{DEST}$, $R_{SRC}$, #IMMEDIATE
Format Variables:

| T: | byte(0) |
| --- | --- |
|  | word(1) |
| $R_{DEST}$ | designation register to store result |
| $R_{SRC}$ | source register containing operand |
| IMMEDIATE: | zero-extended immediate value |

SUB (FIG. 7l)

Operation:
Subtract contents of one source register ($R_{SRC2}$) from another source register ($R_{SRC1}$) and store result in the destination register ($R_{DEST}$).
Syntax:
SUB $R_{DEST}$, $R_{SRC1}$, $R_{SRC2}$
Format Variables:

| T: | byte(0) |
| --- | --- |
|  | word(1) |
| $R_{DEST}$ | destination register to store result |
| $R_{SRC1}$: | source register containing operands |
| $R_{SRC2}$: | source register containing subtracthend |

SUBC (FIG. 7m)

Operation:
Subtract contents of one source register ($R_{SRC2}$) from another source register ($R_{SRC1}$) using the C condition bit as a borrow bit, and store the result in the destination register ($R_{DEST}$)
Syntax:
SUB $R_{DEST}$, $R_{SRC1}$, $R_{SRC2}$
Format Variables:

| T: | byte(0) |
| --- | --- |
|  | word(1) |
| $R_{DEST}$ | destination register to store result |
| $R_{SRC1}$: | source register containing operands |
| $R_{SRC1}$: | source register containing subtracthend |

SUBI (FIG. 7n)

Operation:
Subtract contents of a zero-extended immediate value from a source register ($R_{SRC}$) and store result in the destination register ($R_{DEST}$).
Syntax:
SUBI $R_{DEST}$, ($R_{SRC}$), #IMMEDIATE
Format Variables:

| T: | byte(0) |
| --- | --- |
|  | word(1) |
| $R_{DEST}$ | destination register to store result |
| IMMEDIATE: | zero-extended immediate value |
| $R_{SRC}$ | source register containing operand |

COMP (FIG. 7o)

Features:
Subtract contents of one source register ($R_{SRC2}$) from another source register ($R_{SRC1}$) and set the codes accordingly.
Syntax:
COMP $R_{SRC1}$, $R_{SRC2}$
Format Variables:

| T: | byte(0) |
| --- | --- |
|  | word(1) |
| $R_{SRC1}$: | source register containing operand |
| $R_{SRC2}$: | source register containing subtracthend |

Features:
The result of the operation is not written back to a register.

COMPI (FIG. 7p)

Operation:
Subtract contents of a zero-extended immediate value from a source register ($R_{SRC}$) and set the condition codes accordingly.
Syntax:
COMPI $R_{SRC}$, #IMMEDIATE
Format Variables:

| T: | byte(0) |
| --- | --- |
|  | word(1) |
| IMMEDIATE: | zero-extended immediate value |
| $R_{SRC}$ | source register containing operand |

Features:
The result of the operation is not written back to a register.

XOR (FIG. 7q)

Operation:
Logically exclusive-or the contents of two source registers ($R_{SRC}$) and store the result in the destination register ($R_{DEST}$).
Syntax:
XOR $R_{DEST}$, $R_{SRC}$, $R_{SRC}$
Format Variables:

| T: | byte(0) |
| --- | --- |
|  | word(1) |
| $R_{DEST}$ | destination register to store result |
| $R_{SRC}$ | source registers containing operands |

OR (FIG. 7r)

Operation:

Logically inclusive—or the contents of two source registers ($R_{SRC}$) and store the result in the destination register ($R_{DEST}$).

Syntax:
OR $R_{DEST}$, $R_{SRC}$, $R_{SRC}$
Format Variables:

| T: | byte(0) |
| --- | --- |
|  | word(1) |
| $R_{DEST}$ | destination register to store result |
| $R_{SRC}$ | source registers containing operands |

AND (FIG. 7s)

Operation:

Logically and the contents of two source registers ($R_{SRC}$) and store the result in the destination register ($R_{DEST}$).

Syntax:
AND $R_{DEST}$, $R_{SRC}$
Format Variables:

| T: | byte(0) |
| --- | --- |
|  | word(1) |
| $R_{DEST}$ | destination register to store restore |
| $R_{SRC}$ | source registers containing operands |

SHL (FIG. 7t)

Operation:

Arithmetically shift the contents of the source register ($R_{SRC}$) one position left and set the least significant bit to 0; store the result in ($R_{DEST}$)

Syntax:
SHL $R_{DEST}$, $R_{SRC}$
Format Variables:

| T: | byte(0) |
| --- | --- |
|  | word(1) |
| $R_{DEST}$ | destination register to store result |
| $R_{SRC}$ | source register containing operand |

SHR (FIG. 7u)

Operation:

Arithmetically shift the contents of the source register ($R_{SRC}$) one position right and maintain the previous value in the most significant bit; store the result in ($R_{DEST}$).

Syntax:
SHR $R_{DEST}$, $R_{SRC}$
Format Variables:

| T: | byte(0) |
| --- | --- |
|  | word(1) |
| $R_{DEST}$ | destination register to store result |
| $R_{SRC}$ | source register containing operand |

ROL (FIG. 7v)

Operation:

Rotate the contents of the source register ($R_{SRC}$) one position left where the least significant bit is set to previous value of the most significant bit; store the result in ($R_{DEST}$)

Syntax:
ROL $R_{DEST}$, $R_{SRC}$
Format Variables:

| T: | byte(0) |
| --- | --- |
|  | word(1) |
| $R_{DEST}$ | designation register to store result |
| $R_{SRC}$ | source register containing operand |

ROR (FIG. 7w)

Operation:

Rotate the contents of the source register ($R_{SRC}$) one position right where the most significant bit is set to previous value of the least significant bit; store the result in ($R_{DEST}$).

Syntax:
ROR $R_{DEST}$, $R_{SRC}$
Format Variables:

| T: | byte(0) |
| --- | --- |
|  | word(1) |
| $R_{DEST}$ | destination register to store result |
| $R_{SRC}$ | source register containing operand |

As described hereinabove, CPU 11 broadcasts the GPC 12 value, which corresponds to the program, not the microinstruction, address of the instruction to be executed, to all of the IDUs 40 over the IDU/CPU instruction bus 50. When comparator 45a of an IDU bus capture unit 45 indicates that the associated IDU has that instruction decoded, bus capture logic 45b operates to capture the IDU/CPU bus 50 and sends the microprogram for that instruction to CPU 11. CPU 11, therefore, cannot change GPC 12 until the last microinstruction of the microprogram for an instruction being executed has been received.

V. Instruction Decoding Units

The main task of the preferred embodiment of IDU 40 shown in FIG. 3 is to selectively decode the instructions resident in its local instruction memory 41 into the microcode needed by CPU 11 in order to provide an uninterrupted flow of microinstructions to CPU 11. Each IDU 40 basically reads instructions from local instruction memory 41 for selected segments according to the segment data contained in the SCT stored in memory 44a, decodes those instructions, and delivers them to CPU 11 when they are needed.

All information necessary for IDU operation including the instructions (with attached end segment flags) loaded into the local instruction memory 41, the segmentation information loaded into the SCT of memory 44a, the microinstruction store loaded into decoder microinstruction memory 43b, and the control signals for these memories, is loaded to the IDU's various memories from PEC 60 via the PEC/IDU bus 70.

As described hereinabove, each line in the SCT contains information concerning the program and local addresses of a segment and the SCT table address for the next segment's information if the current segment is ended or skipped.

When a segment is first selected to be decoded from the SCT, the local address in the IDU local memory 41 of the start instruction of the segment is loaded into a local address counter (LAC) 44b, and its program address is loaded into the LPC 42. LAC 44b is used to read an instruction from local instruction memory 41. This instruction is fed into the decode logic 43 of decoder 43, which finds the corresponding microprogram for the instruction in an associated microinstruction memory 43b.

More specifically, the register and immediate operand (OP) and condition code fields of the instruction are placed in the proper microinstruction fields. This reorganizing is based on the type of the instruction, i.e., whether it is an arithmatic logic unit (ALU), memory or other instruction. The op code is used to address microinstruction memory 43b. The microprogram containing the microcontrol information is fed to the proper microinstruction fields.

These microinstructions from microinstruction memory 43b are sent to buffer memory 46. The LPC 42 address value is compared with the GPC 12 address value broadcast from CPU 11. If these two values match, CPU 11 has requested the instruction which the particular IDU 40 has decoded, and bus capture unit comparator 45a generates an "IDU active" signal which enables bus capture logic 45b. The IDU thus captures IDU/CPU bus 50 and sends the microinstructions stored in buffer 46 to CPU 11. Each time a segment instruction is decoded by an IDU 40, the LAC 44b and LPC 42 in the IDU are incremented by a control signal produced by decoder 43 to address the next instruction in the segment. When a segment ends or is not needed, a further control signal is generated, as described in more detail hereinbelow, which causes address unit 44 to select the next segment to be decoded in accordance with the information then present in the SCT.

IDU Clocking

Each IDU 40 advantageously operates on an externally generated three phase clock (not shown). The IDU operations performed during each phase, as defined by clock signals $\phi_1$, $\phi_2$ and $\phi_3$, for one decoding cycle, are described and shown in the timing diagram of FIG. 5. As shown, the operation of each of the IDUs is pipelined, i.e., the next instruction is being read from the instruction memories while the previous instruction is completing its decoding.

The Local Program and Local Address Counters

Figure 5:
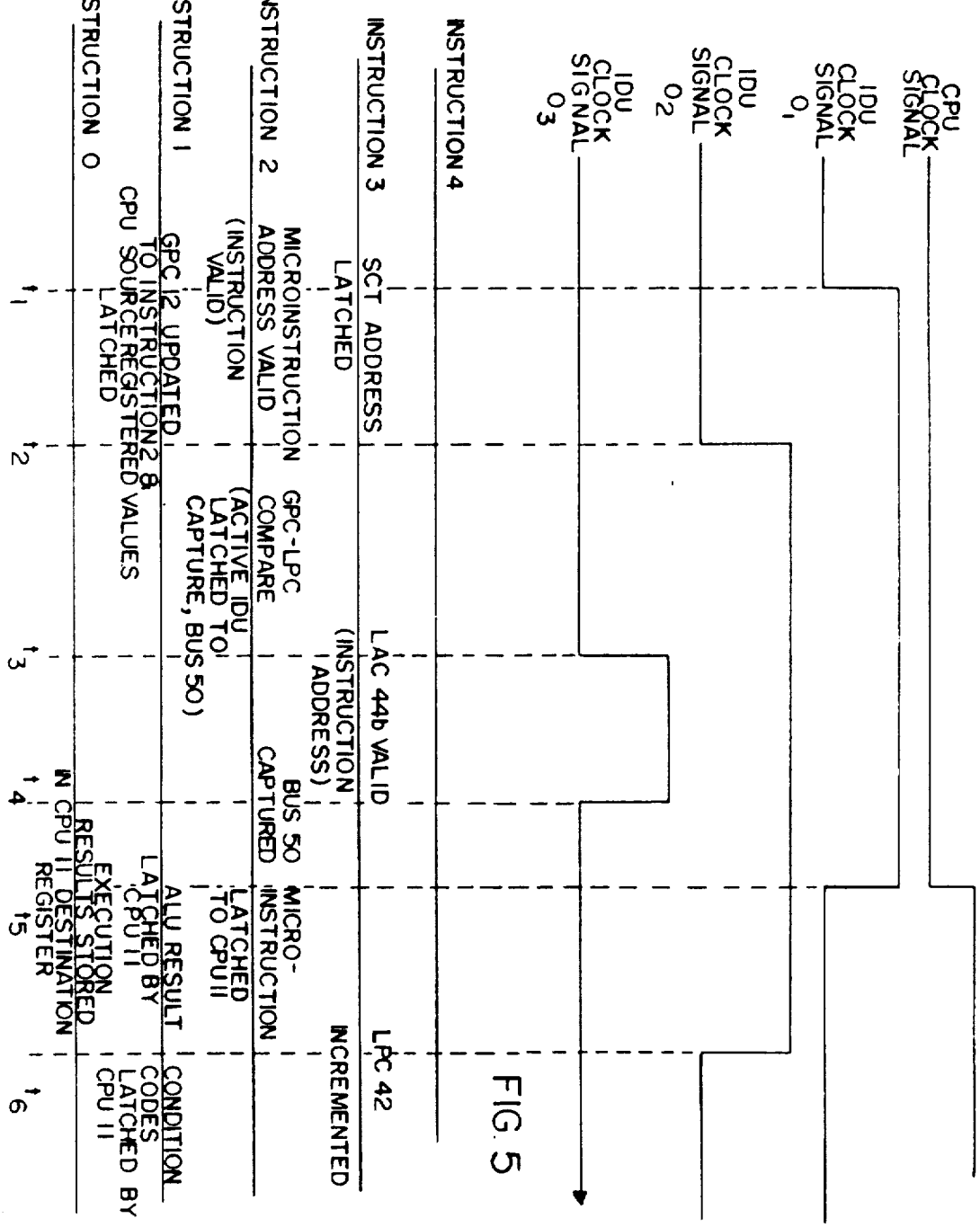
FIG. 5 is a timing diagram showing the relationship of various PRISM operations.

Both LPC 42 and LAC 44b advantageously are constructed from four bit binary up/down counters. Referring to FIG. 5, LAC 44b is clocked on the rising edge of clock signal $\phi_3$ at time $t_c$, and LPC 42 is clocked on the falling edge of clock signal $\phi_2$, at time $t_f$.

LAC 44b provides addresses to the address drivers of local instruction memory 41. LAC 44b loads starting data from a local start address field of the SCT. The load enable signal is controlled by the segment skip signal, a segment end flag included with the previous instruction, and the reset signal. A LAC load takes place if any one of these signals is active. The count enable is generated from the new instruction and the IDU active signals. LAC 44b counts up whenever the new instruction signal is active while the IDU is active. This count enable does not have to be active, however, for a load to take place.

LPC 42 loads its starting data from a start instruction address field of the SCT. Since the SCT is read based on the instruction about to be decoded, and LCP 42 should contain the address of the instruction which has just been decoded, this initializing data preferably should pass through a series of latches (not shown) to ensure it arrives at LPC 42 at the proper time. Once the program address data is latched out of memory 44a, it is loaded in LPC 42 after the bus capture comparison has been made. The data is loaded into LPC 42 based on an enable generated from a segment end signal produced by decoder 43, the IDU active signal, the segment skip signal and the reset signal. It will be appreciated that the segment end signal used here is not the same as the segment end flag embedded in the instruction, but rather is derived from the segment end flag by decoder 43, as is explained in more detail hereinbelow. The load of LCP 42 is enabled if a skip or reset occurs, or if the segment ends while the IDU is active. LPC 42 counts up if the IDU is active and the microinstruction set being sent to CPU 11 has indicated a program counter change.

The Decoder

Decoder 43 must accomplish the following operations:

transfer the register operand, immediate operand and condition code fields of the instruction to the proper fields of the microinstruction;

control the access to microinstruction memory 43b so that the proper microprogram is sent to CPU 11; and generate the LPC 42 change, new instruction request and segment-end and segment-skip control signals.

Generating the Microprogram for a Decoded Instruction

The loading, addressing and general operation of microinstruction memory 43b is identical to that for local instruction memory 41 except for the generation of the output enable signal and the latching of the output. The output enable signal for the microinstruction memory 43b is controlled by the clock signal $\phi_1$. The output of memory 43b will be discussed in a later section.

As shown in FIG. 8, decode logic 43a advantageously comprises an input register and control signal generator 431 for generating control signals indicative of the type of operation (load/store, store, ALU) an inputted instruction represents, based on the three most significant bits of the inputted instruction; a multiplexor unit 432 responsive to an ALU control signal from input register and control signal generator 431 for performing field reorganization of the inputted instruction; and a conventional microprogram controller 433 having a microprogram counter 433a which determines the address for microinstruction memory 43b. When an instruction is ready for decoding, the op code is placed on the data lines for controller 433. Since, as seen from FIGS. 6a-6d, the op code is longer if it is for an ALU instruction, the ALU control signal is used as an input to multiplexor 432. If the ALU signal is active, multiplexer 432 sends the four least significant bits of the op code on to controller 433. If not, these bits are set to zero.

The last microinstruction of a microprogram contains the new request signal (active low) which indicates a new instruction is needed. When it is received by controller 433, the input on the controller data lines is loaded into input register and control signal generator 431. Thus, when the new instruction request signal is received, the op code of the next instruction is loaded into input register and control signal generator 431.

Each microinstruction also contains the instruction to be executed next by controller 433, and each microprogram ends with a jump instruction causing controller 433 to jump to the location which has been loaded into its register, and to load this address into microprogram counter 433a of controller 433. the IDU's case, this data is the base address of the microprogram sequence for the next instruction. If there is more than one microinstruction in a microprogram, the microinstructions other than the last one contain a "continue" instruction, which causes controller 433 to increment its microprogram counter 433a and address the next microinstruction.

When an IDU 40 is inactive, a jump instruction is always fed to the associated controller 433, which allows the IDU to change segments even when it is not being accessed. If a segment is skipped, for example, the IDU in which the skipped segment resides must be able to start decoding the new segment even though it is not being accessed by CPU 11.

The Segment Control Table

As noted hereinabove, the SCT stored in memory 44a of address unit 44 contains all the information concerning the location of the segments loaded into an IDU's local instruction memory 41, and information concerning the dependencies of those segments. There are five fields in the SCT:

Start Instruction Address The 16 bit program address of the start of a segment used by LPC 42.

Start Local Address—The bit local address of the start of a segment used by LAC 44b.

Next-Segment-on-End—The four bit address back into the SCT indicating the next segment to be decoded following the end of the current segment.

Next-Segment-on-Skip—The four bit address back into the SCT indicating the next segment to be decoded if the current segment is skipped.

IDU Pair Number—A four bit field used to determine if a segment has been skipped. This mechanism is described in the following section.

The format of the select signals input into the SCT is shown in FIG. 9.

Control Signal Generation

Several control signals are generated by decoder 43. The new instruction request signal is embedded in the microinstruction itself. The LPC 42 change signal is derived from the LPC load and increment microinstruction control lines. If either of these control lines are active, the LPC change signal is active.

A segment-end control signal is also generated by control logic 450 (FIG. 8). As noted hereinabove, the segment end flag contained in the instruction is used by IDU components concerned with instruction memory access, such as LAC 44b and SCT memory 44a. Since each instruction may need several microinstructions to complete its execution, this flag is itself inadequate to indicate the end of a segment to the microinstruction-dependent components such as LPC 42 and the bus capture logic 45b. These components must know when the last microinstruction of a segment has been decoded. Accordingly, the segment-end flag bit contained in the instruction is combined in control logic 450 with the last microinstruction bit contained in the last microinstruction of each instruction to detect the end-of-segment condition and generate the segment-end control signal. Because of the pipelined nature of IDUs 40, the end-of-segment condition actually occurs during decoding of the last microinstruction of the second-to-last instruction in the segment.

The generation of the segment-skip signal is based on the IDU pair number. IDU/CPU bus 50 includes an IDU/IDU bus 50a between all of the IDU's. The output to the IDU/IDU controlled by the same bus capture unit 45 which controls the output to IDU/CPU bus 50.

Since only binary branches are allowed in the preferred embodiment of the invention, for each segment following a branch that is executed, there is another segment, its pair, which has been skipped. FIG. 10 shows the way segment pairs are determined. When the segments are partitioned and assigned to different IDU's, an identification number of the IDU to which a segment's pair has been assigned is included in that segment's SCT information. When a segment is needed by CPU 11 and the IDU in which the segment resides has captured bus 50, that (active) IDU also broadcasts the IDU number of the segment's pair segment over IDU/IDU bus 50a to all other IDUs 40 using open-collector logic. The inactive IDUs monitor IDU/IDU bus 50a. When an inactive IDU sees its number on the IDU/IDU bus, it knows that the segment it currently has decoded has been skipped and generates the segment-skip signal. That is, each inactive IDU 40 compares its identification number, which numbers advantageously are hardwired into the respective IDUs, with the pair number broadcast by the active IDU 40. When a match occurs, the segment-skip signal is generated by the inactive IDU 40 having the match, which causes prefetching and decoding of the next segment, as determined by the next-segment-on-skip data stored in the associated SCT, to be commenced by the IDU.

VI. IDU Verification

Several tasks preferably are performed to verify that an IDU is operating correctly. They involve testing each feature of the IDU's implementation. When the IDU passes the tests, it is ready to be connected to a complete PRISM system. The tests 1. Decoding tests:
   (a) Simple decoding—one microinstruction per instruction.
   (b) Decoding all classes of instructions.
   (c) Complex decoding—more than one microinstruction per instruction.
2. Segmentation tests:
   (a) Decoding two segments separated by a segment decoded in another IDU.
   (b) Decoding two sequential segments.
   (c) Decoding three segments where the second segment is skipped.
3. Operational tests—mixture of all of the above.

The decoding tests test the IDU's ability to decode any type of instructions. The instruction memory is loaded with one segment of instructions. The SCT memory 44a is loaded with one line of segmentation information with the IDU pair number being any number other than the IDU number of the IDU system under test. This requirement is necessary to ensure that the skip signal is never active. For the first test, microinstruction memory 43b is loaded with one microinstruction at the base address of each memory block. The new instruction request field of these microinstructions must be active, and the controller 43a instruction must be a jump. A GPC 12 value matching the start program address of the test segment is placed on the bus and is incremented on the rising edge of clock signal $\phi_1$. Bus 50 is monitored to determine if the correct sequence of microinstructions are delivered. The second test involves loading a collection of all three types of instructions, load/store, store and ALU, into local instruction memory 41. Bus 50 is monitored to determine that the register and immediate operand and condition code fields are correct.

The third decoding test validates the IDU's ability to decode complex segments. Microinstruction memory 43b is loaded with microprograms of one and more than one microinstructions per instruction. The microinstruction fields used by decoder 43 must be set in accordance to the criteria described hereinabove. The program counter increment and program counter load fields of a multiple microinstruction microprogram cannot be active until the last microinstruction of that microprogram. Again, the microinstructions are monitored for proper operation while the GPC 12 value is incremented through the segment's program address space.

The segmentation tests test the IDU's ability to switch between segments. The first two tests demonstrate the ability to decode two segments where the first segment was processed and ended normally. Two segments are loaded into local instruction memory 41 and two lines of information are loaded into SCT memory 44a. The next-segment-on-end field of the first segment is set to address the second segment. GPC 12 is set to increment through the address space of the first segment. When this segment is completed, GPC 12 broadcasts at least two addresses not contained in either segment. This break represents another IDU decoding another segment. During the break, bus 50 is monitored to ensure that it is not connected to the IDU under test. After the break, GPC 12 broadcasts the addresses of the second segment. Bus 50 should be monitored to verify that the second segment is being decoded.

The two segments are reloaded so that they occupy sequential parts of the program address space for the second test. Actually, the segments do not have to be reloaded into local instruction memory 41. Only the start program address fields in the associated SCT entries must change. GPC 12, in this case, does not break between the two segments. This test demonstrates that the IDU can decode sequential instructions streams which are contained in different segments of the same IDU and possibly stored in non-sequential locations in the instruction memory.

The third test validates the IDU's ability to identify a skipped segment. Three segments of code are loaded. GPC 12 is set to increment through the program addresses of the first segment. The first segment's SCT data instructs the IDU to begin decoding the second segment. GPC 12 again broadcasts addresses not resident in any of the loaded segments. In addition, the IDU/IDU bus 50a is set to the IDU number of the unit under test. During this inactive period, the IDU should be disconnected from bus 50. The second segment's next-segment-on-skip field instructs the IDU to begin decoding the third segment. When GPC 12 broadcasts the program addresses of the third segment, the microinstructions observed should be those for the instructions in the third segment.

INDUSTRIAL APPLICATIONS

The PRISM architecture of the present invention can provide sustained performance on the instruction pipeline effectively equal to its peak performance by its unique method of instruction prefetching and dealing with instructions, such as branch statements and subroutine calls, which create non-sequential program flow. Whereas other computers can achieve non-degradation of performance in special, limited cases, the PRISM system can sustain peak performance regardless of the size, structure or complexity of the program being executed. Simulations of the PRISM architecture have shown that the performance improvements due to this system can approach 50%. These simulations did not take into account the effects of page faults. PRISM will have no page faults because, by construction, it will always have the needed instruction ready for execution. Thus, the performance improvement could be even greater than has been presently demonstrated.

The performance improvements generated by the PRISM architecture result from the ability to remove instruction pipeline bubbles by replicating the instruction fetch and decode operations. PRISM does not, however, use any new methods to speed data accesses. Since the data memory can be attached to the CPU and be separate from the instruction memory, any technique used to speed these accesses can be applied in the PRISM CPU.

The PRISM architecture and method are best suited for inclusion in large computer systems which process mostly scientific, batch processing workloads. These types of systems include the IBM 3090 series, the Amdahl 5900 series and all of the Cray class machines. Large scientific programs often contain loops in which most of the computation is done. PRISM would greatly improve the speed of the branches inside these inner loops, as well as the speed of the loop control itself. Accordingly, the PRISM architecture (in the form described hereinabove) is well suited to the batch-type processing usually found in large scientific workloads.

In addition, a very significant class of applications for PRISM is in the control unit of single instruction multiple data path (SIMD) computer architectures, such as the MPP and the Connection Machine computers, because the cost of the control unit of such computers is only a small fraction of the cost of these machines, but the speedup of the control unit operation affects all of the parallel execution units.

It will be appreciated by those skilled in the art that the present invention is not limited to the disclosed illustrative preferred embodiments, and that numerous modifications can be made without departing from the scope or spirit of the invention.

What is claimed is:

1. A method for fetching, for execution by a computer central processing unit (CPU), of instructions of a computer program having program flow changes, the method comprising the steps of:
   extracting program flow information from the computer program prior to execution;
   monitoring execution of the computer program;
   selectively storing, based on the program instruction being executed and the program flow information, different portions of the computer program in a plurality of fetch units such that all instructions that potentially could be needed when the next instruction is executed by the CPU are stored in said fetch units, and such that no single fetch unit contains both a program portion having a branch taken instruction and a program portion containing a branch not taken instruction for the same branch instruction; and selectively communicating instructions from said fetch units to the CPU based on determination of the next instruction to be executed.

2. The method of claim 1 wherein said program flow information extracting step comprises partitioning of the computer program into segments based on instructions corresponding to entry points and to potential non-unit steps in the sequence of instructions to be executed.

3. The method of claim 2 wherein a segment may contain only one entry point instruction, which must be the first instruction of that segment.

4. The method of claim 3 wherein each program label constitutes the beginning of a segment.

5. The method of claim 4 wherein each instruction immediately preceding the start of a segment constitutes the end of another segment.

6. The method of claim 5 wherein the first instruction of the computer program constitutes the beginning of one of the segments, and the last instruction of the computer program constitutes the end of one of the segments.

7. The method of claim 2 wherein the CPU has global program instruction counter (GPC) means for producing a GPC value identifying a next program instruction to be executed by the CPU; said program execution monitoring step comprises the step of monitoring the GPC value to determine the program instruction and segment which is presently to be executed by the CPU; and said selectively storing step comprises the step of determining each of the segments which constitutes a potential next segment to be executed following execution of the instruction corresponding to the present GPC value.

8. The method of claim 7 wherein said selectively storing step comprises the step of changing the contents of selected fetch units in response to the flow of program execution.

9. The method of claim 7 wherein said selectively storing step comprises the further steps of:

analyzing the program flow change information to determine how soon a bypassed potential next segment may be subsequently needed for execution by the CPU; and distributing segments to said fetch units so as to minimize the need to reload segments which may soon be needed again if bypassed.

10. The method of claim 7 wherein said selectively storing step comprises the further steps of:

maintaining a memory of instruction return addresses identifying instructions to be respectively executed following subroutine RETURN instructions; and using the most recently entered instruction return address in said memory to identify the potential next segment for a subroutine segment having a RETURN statement as the end of the 11. The method of claim 7 wherein said selectively storing step comprises the further steps of:

determining the minimum time required for the CPU to execute the segment which is presently being executed;

determining whether each potential next segment for the instruction being executed has already been stored in a fetch unit; and if each potential next segment is already stored in a fetch unit, releasing, for storage of new segments, each fetch unit not containing a potential next segment for storage of new segments, during execution of the segment presently being executed.

12. The method of claim 11 wherein said selectively storing step comprises the further step of distributing segments to fetch units in accordance with a bin-packing analysis of the available free space within each fetch unit.

13. Apparatus for fetching, for execution by a computer central processing unit (CPU), of instructions of a computer program having program flow changes, the apparatus comprising:

means for extracting program flow information from the computer program prior to execution;

means for monitoring execution of the computer program;

means for selectively storing, based on the program instruction being executed and the program flow information, different portions of the computer program in a plurality of fetch units such that all instructions that potentially could be needed as the program execution continues by the CPU are stored in said fetch units, and such that no single fetch unit contains both a program portion having a branch taken instruction and a program portion containing a branch not taken instruction for the same branch instruction; and means for selectively communicating instructions from said fetch units to the CPU based on determination of the next instruction to be executed.

14. The apparatus of claim 13 wherein said extracting means partitions the computer program into segments based on instructions corresponding to entry points and to potential nonunit steps in the sequence of instructions to be executed.

15. The apparatus of claim 14 wherein a segment may contain only one entry point instruction, which must be the first instruction of that segment.

16. The apparatus of claim 15 wherein each program label constitutes the beginning of a segment.

17. The apparatus of claim 16 wherein each instruction immediately preceding the start of a segment constitutes the end of another segment.

18. The apparatus of claim 17 wherein the first instruction of the computer program constitutes the beginning of one of the segments, and the last instruction of the computer program constitutes the end of one of the segments.

19. The apparatus of claim 14 wherein the CPU has global program instruction counter (GPC) means for producing a GPC value identifying the next program instruction to be executed by the CPU; said program execution monitoring means monitors the GPC value to determine the program instruction and segment which is presently to be executed by the CPU; and said selectively storing means determines each of the segments which constitutes a potential next segment to be executed following execution of the instruction corresponding to the present GPC value.

20. The apparatus of claim 19 wherein said selectively storing means changes the contents of selected fetch units in response to the flow of program execution.

21. The apparatus of claim 19 wherein said selectively storing means analyzes the program flow change information to determine how soon a bypassed potential next segment may be subsequently needed for execution by the CPU, and distributes segments to said fetch units so as to minimize the need to reload segments which may soon be needed again if bypassed.

22. The apparatus of claim 19 wherein said selectively storing means further comprises:
   memory means for storing instruction return addresses identifying instructions to be respectively executed following subroutine RETURN instructions; and
   means for using the most recently entered instruction return address in said memory to identify the potential next segment for a subroutine segment having a RETURN statement as the end of the segment.

23. The apparatus of claim 19 wherein said selectively storing means determines the minimum time required for the CPU to execute the segment which is presently being executed; determines whether each potential next segment for the instruction being executed has already been stored in a fetch unit; and if each potential next segment is already stored in a fetch unit, releases, for storage of new segments, each fetch unit not containing a potential next segment for storage of new segments, during execution of the segment presently being executed.

24. The method of claim 23 wherein said selectively storing means distributes segments to fetch units in accordance with a bin-packing analysis of the available free space within each fetch unit.

25. The apparatus of claim 14 further comprising means for storing said computer program instructions in a compiled code form and for storing segment data produced by said extracting means; and wherein:
   the CPU executes microprograms corresponding to the compiled instructions stored in said storing means; and
   said fetch units each comprises means for decoding segment instructions into corresponding microprograms and selectively supplying the microprograms to the CPU for execution.

26. The apparatus of claim 25 wherein the CPU includes global program instruction counter (GPC) means for producing a GPC value identifying the address of the next program instruction to be executed, and wherein said segment data includes data denoting the end of each segment, and each said fetch unit further comprises:
   local instruction memory means for storing instruction segments loaded by said selectively storing means;
   address means for determining which resident segments stored in said local instruction memory are to be next decoded by the fetch unit;
   decoder means responsive to said address means for decoding segment instructions into the corresponding microprograms;
   local program instruction counter (LPC) means responsive to said address means and to said decoder means for producing an LPC value identifying which instruction has been decoded by the IDU; and
   bus capture means responsive to said GPC and LPC means for determining when the microprogram of a decoded instruction is to be communicated to the CPU.

27. The apparatus of claim 26 wherein said address means comprises:
   memory means for storing a segment control table (SCT) loaded by said selectively storing means, said SCT containing information derived from said segment data regarding the dependency of the segments resident in said local instruction memory, the global address within the program being executed of the start of each of said resident segments, and the local address within said local instruction memory means of the start of each of said resident segments; and
   local address counter (LAC) means responsive to said SCT memory means for controlling access to said local instruction memory means by said decoder means.

28. The apparatus of claim 26 wherein the dependency information contained in said SCT includes the addresses within said SCT of the dependency information for the next segment to be decoded if the current segment is ended or skipped.

29. The apparatus of claim 26 wherein said decoder means comprises:
   microinstruction memory means for storing microprograms loaded by said selectively storing means corresponding to said resident segment instructions stored in said local instruction memory means of the fetch unit;
   decode control means for reorganizing the instruction accessed from said local instruction memory means such that the individual microinstructions of the microprogram corresponding to the instruction being decoded can be accessed; and
   buffer storage means responsive to said bus capture means for temporarily storing the microprogram accessed from said microinstruction memory means.

30. The apparatus of claim 29 wherein said decode control means is responsive to a control instruction encoded with the last microinstruction of a microprogram to cause incrementing of said LPC value in said LPC means following completion of a program instruction decoding.

31. The apparatus of claim 26 wherein said bus capture means comprises:
   comparator means for comparing said GPC and associated LPC value; and
   gate means responsive to said comparator means for controlling connection of the output of said decoder means to the CPU.

32. The instruction decoding system of claim 26 further comprising:
   fetch unit bus means for interconnecting said fetch units; and
   means included with each fetch unit responsive to the bus capture means of the associated fetch unit determining that the microprogram of a decoded branch instruction is to be communicated to the CPU for communicating over said fetch unit bus means a skip signal identifying the fetch unit in which resides the potential next segment which is to be skipped as a consequence of the branch instruction.

33. A method for fetching, for execution by a computer central processing unit (CPU), of instructions of a computer program having flow changes, the method comprising the steps of:

extracting program flow information from the computer program prior to execution;

monitoring execution of the computer program;

selectively prefetching, based on an instruction pointer of the instruction being executed and information from the program flow graph, different portions of a computer program in a plurality of fetch units such that all instructions that potentially could be needed for execution by the CPU as the program execution continues are prefetched, and if needed stored in said fetch units, and such that no single fetch unit contains both a program portion having a branch taken instruction and a program portion having a branch not taken instruction for the same branch instruction; and selectively communicating the instructions from said fetch units to the CPU based on the determination of the next instruction to be executed.

* * * * *